United States Patent
Patris et al.

(10) Patent No.: US 10,127,226 B2
(45) Date of Patent: Nov. 13, 2018

(54) METHOD FOR DIALOGUE BETWEEN A MACHINE, SUCH AS A HUMANOID ROBOT, AND A HUMAN INTERLOCUTOR UTILIZING A PLURALITY OF DIALOG VARIABLES AND A COMPUTER PROGRAM PRODUCT AND HUMANOID ROBOT FOR IMPLEMENTING SUCH A METHOD

(71) Applicant: SOFTBANK ROBOTICS EUROPE, PARIS (FR)

(72) Inventors: Magali Patris, Paris (FR); David Houssin, Paris (FR); Jérôme Monceaux, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 0 days.

(21) Appl. No.: 15/025,540

(22) PCT Filed: Sep. 29, 2014

(86) PCT No.: PCT/EP2014/070782
§ 371 (c)(1),
(2) Date: May 11, 2016

(87) PCT Pub. No.: WO2015/049198
PCT Pub. Date: Apr. 9, 2015

(65) Prior Publication Data
US 2016/0283465 A1    Sep. 29, 2016

(30) Foreign Application Priority Data

Oct. 1, 2013  (FR) ...................................... 13 59514

(51) Int. Cl.
*G06F 17/27*   (2006.01)
*G06N 3/00*    (2006.01)
(Continued)

(52) U.S. Cl.
CPC .......... *G06F 17/279* (2013.01); *G06F 17/271* (2013.01); *G06K 7/1404* (2013.01);
(Continued)

(58) Field of Classification Search
None
See application file for complete search history.

(56) References Cited

U.S. PATENT DOCUMENTS 6,604,094 B1    8/2003  Harris
6,728,679 B1    4/2004  Strubbe et al.
(Continued)

FOREIGN PATENT DOCUMENTS

| | | |
|---|---|---|
| JP | 2001188784 A | 7/2001 |
| JP | 2004195636 A | 7/2004 |
| RU | 2336560 C2 | 10/2008 |

OTHER PUBLICATIONS

S. Rosenthal et al., "Mixed-Initiative Long-Term Interactions with an All-Day-Companion Robot," Dialogs with Robots: Papers from the AAAI Fall Symposium (FS-10-05), 2010, pp. 97-102.
(Continued)

*Primary Examiner* — Satwant Singh
(74) *Attorney, Agent, or Firm* — Baker & Hostetler LLP

(57) ABSTRACT

A method for performing a dialog between a machine, preferably a humanoid robot, and at least one human speaker, comprises the following steps, implemented by a computer: a) identifying the human speaker; b) extracting from a database a speaker profile comprising a plurality of dialog variables, at least one value being assigned to at least one of the dialog variables; c) receiving and analyzing at least one sentence originating from the speaker; and d) formulating and emitting at least one response sentence as a function at least of the sentence received and interpreted in step c) and of one dialog variable of the speaker profile.

16 Claims, 3 Drawing Sheets

(51) Int. Cl.
    *G10L 15/22* (2006.01)
    *G10L 17/22* (2013.01)
    *G06K 7/14* (2006.01)
    *G06K 9/00* (2006.01)
    *G10L 13/02* (2013.01)

(52) U.S. Cl.
    CPC ..... *G06K 9/00288* (2013.01); *G06K 9/00677* (2013.01); *G06N 3/008* (2013.01); *G10L 13/02* (2013.01); *G10L 15/22* (2013.01); *G10L 17/22* (2013.01)

(56) References Cited

U.S. PATENT DOCUMENTS

| | | | |
|---|---|---|---|
| 7,499,861 B2 * | 3/2009 | Danieli | G10L 15/18 704/270 |
| 7,539,656 B2 | 5/2009 | Fratkina et al. | |
| 7,987,091 B2 * | 7/2011 | Aoyama | G10L 15/22 704/245 |
| 2001/0021909 A1 | 9/2001 | Shimomura et al. | |
| 2002/0133347 A1 | 9/2002 | Schoneburg et al. | |
| 2004/0015344 A1 | 1/2004 | Shimomura et al. | |
| 2006/0017802 A1 | 1/2006 | Yoo et al. | |
| 2006/0047362 A1 | 3/2006 | Aoyama et al. | |
| 2006/0155765 A1 | 7/2006 | Takeuchi et al. | |
| 2009/0024393 A1 * | 1/2009 | Kaneyasu | G10L 13/033 704/260 |
| 2011/0131036 A1 | 6/2011 | DiCristo et al. | |

OTHER PUBLICATIONS

Yuji Yagi, et al., "Realization of Concept-to-speech Conversion for Reply Speech Generation in a Spoken Dialogue System of Road Guidance and its Evaluation," IPSJ (Information Processing Society of Japan) Journal (vol. 48, No. 9) Japan, Information Processing Society of Japan, Sep. 2007, vol. 48, No. 9, pp. 3300-3308.

* cited by examiner

METHOD FOR DIALOGUE BETWEEN A MACHINE, SUCH AS A HUMANOID ROBOT, AND A HUMAN INTERLOCUTOR UTILIZING A PLURALITY OF DIALOG VARIABLES AND A COMPUTER PROGRAM PRODUCT AND HUMANOID ROBOT FOR IMPLEMENTING SUCH A METHOD

CROSS-REFERENCE TO RELATED APPLICATIONS

This application is a National Stage of International patent application PCT/EP2014/070782, filed on Sep. 29, 2014, which claims priority to foreign French patent application No. FR 1359514, filed on Oct. 1, 2013, the disclosures of which are incorporated by reference in their entirety.

FIELD OF THE INVENTION

The present invention relates to a method for dialog between a machine and a human being. The machine can be any data processing device such as a computer, the processor of a "smartphone" or a robot, notably humanoid, comprising at least one embedded processor, and the dialog can be conducted orally. The invention relates also to a computer program product and to a robot, preferably humanoid, for the implementation of such a method.

BACKGROUND

A "humanoid robot" can be defined as a robot exhibiting certain attributes of the appearance and of the functionalities of a human being such as a torso, a head, arms, legs, the capacity to communicate orally with a human being using voice recognition and synthesis means, etc. The aim of this type of robot is to reduce the cognitive distances between man and machine. One of the most important features of a humanoid robot is its capacity to sustain a dialog that is as natural as possible with a human speaker. This capacity is essential for the development of "companion robots", intended to assist the elderly, sick or simply people who are alone in the necessities of daily life, and to provide these people with an acceptable substitute to the presence of a human personal assistant.

The dialog methods for humanoid robots known from the prior art are not satisfactory because they lead to dialogs that are repetitive and stereotyped, and at the very least unnatural.

The paper by S. Rosenthal and M. Veloso *"Mixed-Initiative Long-Term Interactions with an All-Day-Companion Robot"*, in *Dialogs with Robots: Papers from the AAAI Fall Symposium* (*FS*-10-05), pages 97-102, describes a robot capable of guiding a human being in a visit, for example to the robotics department of a university. The robot is programmed to avoid the repetitions during the dialog; however, two different human speakers will be offered substantially identical dialogs.

The document U.S. Pat. No. 7,539,656 describes a method by which a machine dialogs with a human speaker to obtain information necessary to provide him or her with a service—for example, taking an order for breakfast. Such a dialog is very stereotyped and its purpose is not to reproduce a conversation. The method is therefore not suited to producing efficient "companion robots".

The document U.S. Pat. No. 7,987,091 describes a method by which a machine holds a "personalized" and "progressive" dialog with one or more speakers. The dialog is personalized because the machine conducts the dialog based on a variety of information on the speakers, stored in its memory. It is progressive because the machine acquires new information in the course of the dialog. However, the dialog remains unnatural, because the phases of acquisition and of use of the information are clearly separate.

SUMMARY OF THE INVENTION

The invention aims to overcome the abovementioned drawbacks of the prior art by providing a method for dialog with a machine—and notably a robot—that gets closer to a natural dialog with another human being. More specifically, the invention aims to make it possible to initiate a dialog adapted to the speaker (non stereotyped), that is progressive and natural, which makes it possible to create a genuinely emotional link between the human speaker and the robot. The progression can be heard equally within a same dialog (or "dialog session") and between two successive dialogs, even spaced apart in time, with the same human speaker.

One object of the invention, making it possible to achieve this objective, is a method for performing dialog between a machine and at least one human speaker, comprising the following steps, implemented by said machine:

a) identifying said human speaker;

b) extracting from a database a speaker profile comprising a plurality of dialog variables, at least one value being assigned to at least one of said dialog variables;

c) receiving and analyzing at least one sentence originating from said speaker, analyzing said or each said sentence originating from said speaker to extract therefrom at least one value to be assigned to at least one dialog variable of said speaker profile and store said or each said value in said speaker profile; and d) formulating and emitting at least one response sentence as a function at least of said sentence received and interpreted in step c) and of one said dialog variable of said speaker profile.

The identification of the speaker and the use of a speaker profile to formulate the response sentences allows for a personalization of the dialog. The term "response" should be interpreted widely to cover any sentence emitted in response to a stimulus, not narrowly as meaning "answer to a question".

The analysis of the responses allows the machine to enrich the speaker profile in the course of the dialog, even over successive dialogs. It can be stated that it learns to know the speaker better and better, and to use its knowledge to refine the dialog.

Furthermore, the dialog is not stereotyped because the response from the machine depends both on the profile of the speaker and on at least one sentence that the latter has just spoken. Contrary to what takes place in a method according to the abovementioned document U.S. Pat. No. 7,987,091, there is no separation between a "dialog of acquisition" (of information) and a "dialog of use" (of information). According to the invention, in the course of a same dialog, the machine uses the information on the speaker that it already has available and acquires new information, which can be used immediately or subsequently.

The analysis of said or at least one sentence originating from said speaker and the formulation of said or at least one response sentence can be performed by means of a plurality of sentence patterns represented by respective syntax trees.

Advantageously, at least some of said sentence patterns contain at least one pointer to a dialog variable of said speaker profile. When formulating a response, the machine replaces the pointer with the value of the dialog variable stored in the speaker profile. Conversely, when analyzing a received sentence, the machine interprets a determined word of said sentence—occupying the place which, in the pattern, is held by the pointer—as being a value to be stored in the speaker profile as value of the corresponding dialog variable.

Advantageously, at least some of said sentence patterns can contain at least one pointer to at least one set of terms that are interchangeable in a sentence, called "concept".

Said step d) can be implemented by means of a plurality of rules associating at least one sentence pattern originating from said speaker and at least one response sentence pattern. These rules can in turn be represented by structures of "tree" type.

In this case, in said step d), at least one said rule can associate, with a same sentence pattern originating from said speaker, a plurality of sentence patterns that can serve as response sentences; furthermore, out of said response sentence patterns, those which contain a pointer to a dialog variable to which no value is assigned in said speaker profile can be discarded. Thus, the machine can choose its response as a function of what it knows—or does not know—concerning the speaker.

Advantageously, at least one said rule can be marked by a tag identifying a conversation topic and, in said step d), the rule or rules marked by at least one tag identifying a determined conversation topic can be activated or deactivated as a function of at least one dialog parameter (value—or absence of value—of one or more dialog variables, contextual parameter, history of the dialog, etc.). That is a technical modality for producing the progression of the dialog.

Said speaker profile can also comprise a dialog history and, in said step d), said or at least one said response can also be formulated as a function of said dialog history. That ensures the progression of the dialog and avoids repetitions.

In said step d), said or at least one said response can also be formulated as a function of at least one contextual parameter acquired or determined by said machine. This parameter can notably be a time, determined by a clock: thus, for example, when approaching mid-day, the conversation will be able to relate to lunch. The parameter can also be a date determined by a calendar, a temperature or ambient brightness acquired by a sensor, etc.

In said step a), said human speaker can be identified by means of an image acquisition device such as a camera, by facial recognition or by reading a graphic code presented to said camera. Other identification methods (biometry, code entered via a keypad, voice recognition, etc.) are also possible.

In said step b), the machine can access a remote server via a communication network and download said speaker profile from said database which is stored on said remote server. The machine can also, having accessed said remote server via said communication network, load into said database a speaker profile updated by the storage of at least one value assigned to at least one dialog variable extracted, in said step c), from at least one sentence originating from said speaker. As a variant, the database can be stored locally.

Preferably, said machine comprises a processor embedded in a humanoid robot. Other embodiments are however possible; for example, the machine can be a desktop computer, a "smartphone", a computer onboard a vehicle, etc.

Another subject of the invention is a computer program product (that is to say a computer program in executable format stored on in a hardware storage medium such as a permanent or volatile semiconductor memory, or a disc of CD-ROM type or hard disc) for implementing such a method.

Yet another subject of the invention is a humanoid robot comprising an embedded processor programmed to implement such a method. Advantageously, such a humanoid robot can also comprise:

an image acquisition device, such as a camera, cooperating with said embedded processor to identify a human speaker;

a sound acquisition device, such as a microphone or array of microphones, cooperating with said embedded processor to receive at least one sentence spoken by said human speaker; and a sound emission device, such as a loudspeaker, cooperating with said embedded processor to emit one said response sentence.

BRIEF DESCRIPTION OF THE DRAWINGS

Other features, details and advantages of the invention will emerge on reading the description given with reference to the attached drawings given by way of example and which represent, respectively.

DETAILED DESCRIPTION

Figure 1:
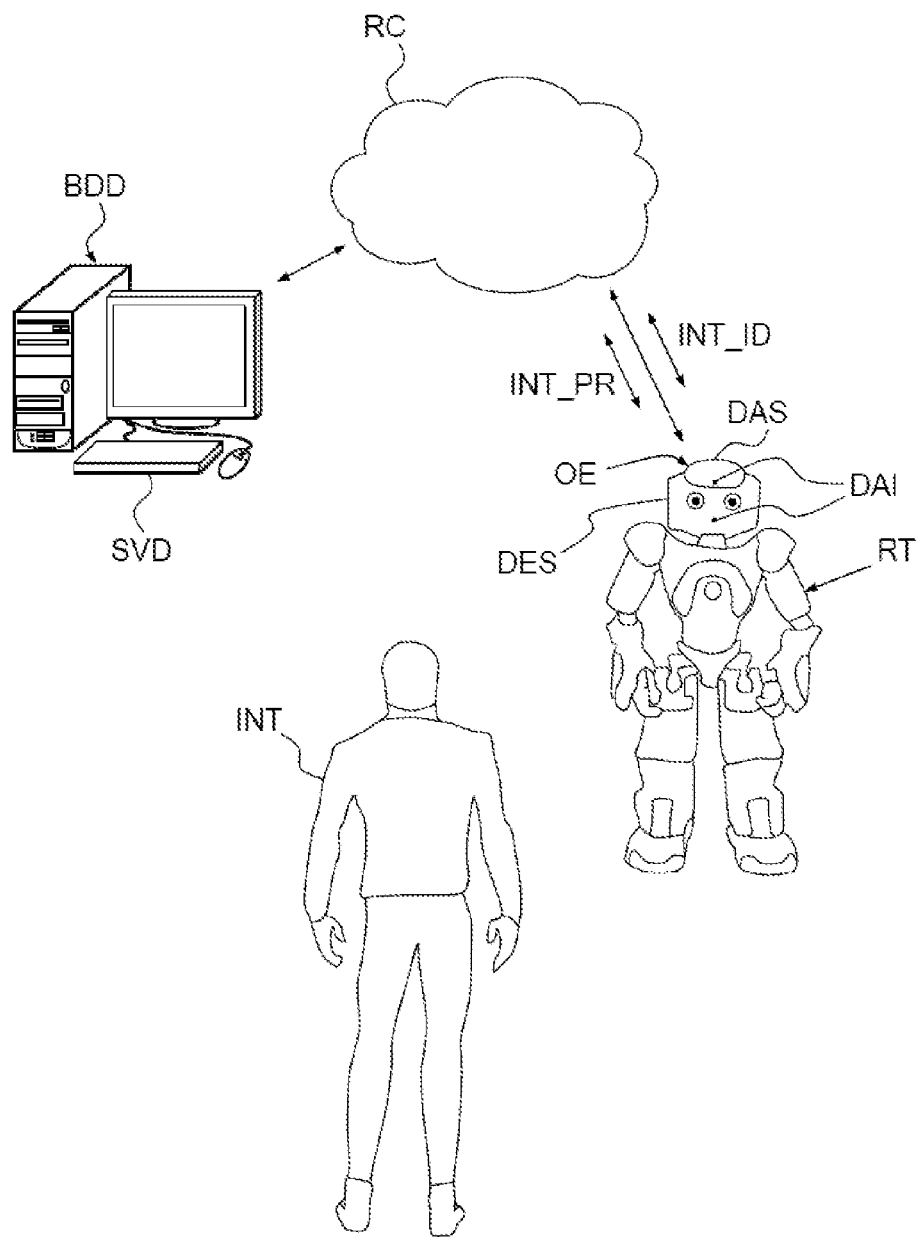
FIG. 1, a humanoid robot dialoging with a human speaker and communicating with a remote server in accordance with an embodiment of the invention.

FIG. 1 represents a humanoid robot RT dialoging with a human speaker INT. The robot comprises, in addition to an articulated body reproducing the form of a human being:

an embedded processor or computer OE, located for example in the head of the robot, implementing the dialog method of the invention; it can be a processor dedicated to this task, or a processor also carrying out other tasks and, at the limit, on its own controlling the robot;

one or more image acquisition devices (cameras) DAI, located in the head of the robot, for example in its mouth and/or on its forehead, for acquiring an image of the speaker INT;

a sound emission device DES (loudspeaker), located for example on the sides of the head of the robot, to allow the latter to "speak"; and one or more sound acquisition devices DAS (microphones), located for example on the upper surface of the head of the robot, to allow the latter to hear.

The image acquisition and sound acquisition devices supply input data to the processor OE, and notably:

at least one image acquired by the devices DAI, making it possible to identify the speaker; it can be an image of the face of said speaker, or a graphic code shown by the latter in order to facilitate the identification (for example, a QR code obtained by virtue of a dedicated application on "smartphone");

sounds that can represent sentences emitted by the speaker, that have to be recognized and analyzed.

The processor OE stores in a memory and executes image recognition and voice recognition software (known per se) to process these input data. As a variant, such software or some of such software can be stored in an external database, as will be explained later.

The sound emission device DES is driven by the processor OE.

The robot RT is in communication, via a network RC (for example, the Internet that it accesses via a WiFi connection) with a remote server SVD which stores a database of "speaker profiles".

The robot transmits to the server SVD an identification datum INT_ID of the speaker INT, obtained by applying an image recognition algorithm (recognition of the face or of a graphic code) to images obtained via the devices DAI. In some cases, this datum can be directly an image, in which case the identification step is implemented by the remote server. For example, in a particular embodiment, a user is registered on the server SVD by means of his or her "smartphone"; the server sends him or her, on said smartphone, a QR code; the user displays this code on the smartphone screen and shows it to the robot by presenting it in front of one of its cameras; the robot retransmits the image of the QR code to the server, which associates said image with the user—who at this point becomes an identified speaker. In other embodiments, the identification is made on the basis of an image of the face of the speaker, by recognition of his or her voice or simply from an introductory sentence spoken at the start of the dialog, such as "Hello, I am Jean".

On the basis of the identification datum received, the server SVD retrieves from the database BDD a speaker profile INT_PR and transmits it to the robot RT via the network RC. The speaker profile is a file containing a list of variables with which is associated one value (even several values) dependent on the user. An extract from the profile of the speaker "Jean Dupont" may for example be the following personal data:

Identifier of the speaker: 00011
First name: Jean
Age: 35
Profession: Engineer
Interests: Swimming; running; cycling
Domestic animals:
Mother tongue: French
Other languages:

This extract contains eight variables: an identifier of the speaker, "First name", "Name", "Age", "Profession", "Interests", "Domestic animals", "Mother tongue" and "Other languages". The first four variables take a single value, which is effectively assigned to them. The "Interests" variable can take a number of values at the same time; in this case, the "swimming", "running" and "cycling" values are assigned to it. The "Domestic animals" variable can take multiple values, but nothing is entered. The last two variables, "Mother tongue" (single value: "French") and "Other languages" (multiple possible values, here nothing entered) are particularly important. In effect, in a multilingual version of the method, the processor can use the values of these variables to determine the language with which to address the speaker (when the robot is the first to speak) or which language parameterization to use for the recognition and the analysis of the sentences heard.

The processor of the robot OE uses the values assigned to the variables (or the fact that nothing is entered for them) to manage the dialog with the speaker INT, as will be detailed later. For this reason, the variables are called "dialog variables".

As will also be detailed later, the processor OE can also be required to modify the content of the speaker profile as a function of the dialog. For example, it may learn that Jean Dupont also speaks English, and assign the value "English" to the "Other languages" variable of his profile. This learning is done by analyzing the sentences spoken by the speaker (in response to a question from the robot, following a non-interrogative sentence emitted by the robot or even spontaneously). After such an update (immediately after, or at the end of the dialog, or at regular intervals, etc.), the processor then transmits to the server SVD a modified version of the speaker profile, which is stored in the database BDD. As a variant, the database BDD can be stored locally, in which case the connection to the network RC is not necessary.

An example of dialog in which the robot uses the information contained in the speaker profile and enriches this same profile is presented hereinbelow. The speaker is "Jean" (identifier 00011), whose profile at the start of the dialog was presented above. The sentences spoken by the robot and by the human speaker are in italics; the words correspond to dialog variables (used or acquired) or to history data of past dialogs (also stored in the profile of the speaker) are underscored.

The robot detects the entry of a person into the visual field of its camera (or one of its cameras) and identifies his or her face as being that of the speaker "00011". It loads the corresponding speaker profile into memory and uses the "Name" information to personalize a partially pre-drafted greeting sentence. The robot also uses information relating to the history of the dialogs: the fact that another dialog with the same speaker took place the day before.

Robot: Hello Jean! Thanks for coming back to see me, that makes me happy!
How have you been since yesterday?
The speaker responds with a question:
Human: Well and you?
The question posed by the speaker ("and you?") triggers a response, which in this case is stereotyped:
Robot: Very well thanks!

To continue the dialog, the robot has recourse to a contextual datum: the date—in this case, May 9, Europe day (this information being stored in the memory of the robot):
Robot: Tell me, do you know that today is Europe day? I think its great, these countries uniting, with all the different languages and cultures. Also, I speak a number of European languages! And you, Jean, do you speak any languages other than French?

The use of the contextual data will be explained in detail later.

To personalize the above sentence (whose general structure or "pattern" is pre-drafted, as will be explained in detail later) the robot uses three items of information from the profile of the speaker: his name ("Jean"), the value ("French") of the "Mother tongue" variable and the fact that the "Other languages" variable has nothing entered. The response from the speaker allows the robot to enrich the profile, by assigning the value "English" to this variable:
Human: Yes, I speak English fluently.

The reply from the robot uses this newly stored value, the value ("Engineer") which had been assigned previously to the "Profession" variable and a "rule"—stored in its memory—associating certain values of the "Other languages" variable and certain values of the "Profession" variable:
Robot: That's great, English is truly a very useful language for the engineering profession.

The robot can also offer the speaker the option to continue the conversation in the language which has just been stored in the profile:
Robot: Do you want to speak a little in English?

Human: OK, that will give me the opportunity to practice.
Robot: Nice, let's go!

The affirmative response from the speaker triggers a dialog in English (it is assumed that the robot is programmed to dialog in this language).

Figure 2:
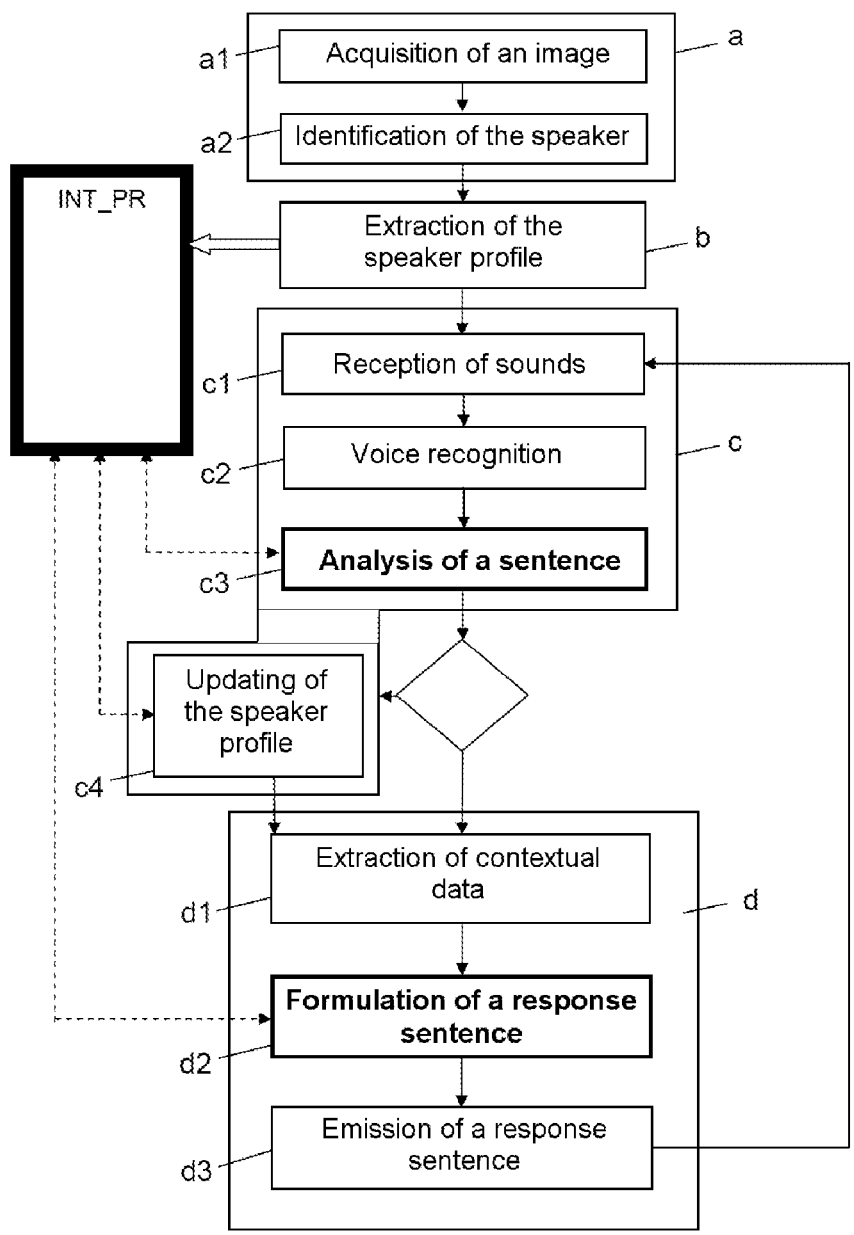
FIG. 2, a flow diagram of a method according to an embodiment of the invention.

At the end of the dialog, the profile of the speaker is changed, because the value "English" has been assigned to his "Other languages" variable:

Identifier of the speaker: 00011
First name: Jean
Age: 35
Profession: Engineer
Interests: Swimming; running; cycling
Domestic animals:
Mother tongue: French
Other languages: English The flow diagram of FIG. 2 illustrates in more detail the implementation of a method according to an embodiment of the invention.

The step a) of identification of a human speaker comprises two substeps:

a substep a1 of acquisition of an image which, as explained above, can be an image of the face of the speaker or even a graphic identification code;

a substep a2 of identification of the speaker by recognition of said image; as explained above, this step can be executed locally or by a remote server.

Other identification modes are also possible.

The step b) comprises the extraction of a speaker profile INT_PR, corresponding to the speaker identified in the step a), from a database stored locally or on a remote server.

Optionally, after the step b), the robot can take the initiative for the dialog, for example by greeting the speaker and by calling him or her by his or her name (if this variable is completed in the speaker profile, which should normally be the case). This step is not represented to avoid overloading the figure.

The step c) comprises four substeps:

a substep c1 of reception of sounds originating from said user by means of the microphone or microphones DAS;

a substep c2 of voice recognition, practiced on the sounds received in substep c1 by using known algorithms, for extracting sentences therefrom;

a substep c3 of analysis of a sentence; this substep will be described in more detail using FIGS. 3A-3D;

if the analysis performed in substep c3 has led to the identification of a new value to be assigned to a variable of the profile, the step c also comprises a substep c4 of updating of said profile.

In simpler embodiments in which the dialog is conducted by writing, via a keyboard and a screen, the substeps c1 and c2 are replaced by a simple text acquisition.

The step d) of response comprises three substeps:

a substep d1, optional, of extraction of contextual data: date, time of day, meteorological data, presence of other people, etc;

a substep d2 of formulation of a response sentence; this substep will be described in more detail using FIGS. 3A-3D; and a substep d3 of emission of the response sentence created in substep d2; this substep is implemented by using known voice synthesis algorithms and the loudspeaker or loudspeakers DES.

The method is therefore iterated from substep c1, the robot waiting for a new sentence from the speaker.

The algorithm can be terminated after a maximum waiting time has elapsed. Furthermore, the sentence analysis performed in substep c3 may indicate to the robot that the speaker wants to end the dialog (for example, such a wish can be deduced from the detection of a sentence like "I have to go"; "goodbye"; "see you soon", etc.). Similarly, if the speaker disappears from the visual field of the cameras DAI (substep D1), the robot may decide to end the dialog. These variants are not illustrated to avoid overloading the figure.

Both the analysis (substep c3) and the formulation (substep d2) of sentences by the processor of the robot implement "patterns". A sentence pattern consists of words, pointers to variables, "concepts" and "tags", as well as action indicators, linked by one or more logic operators. The sentence patterns can be represented by a tree structure called "syntax tree".

Figure 3A:
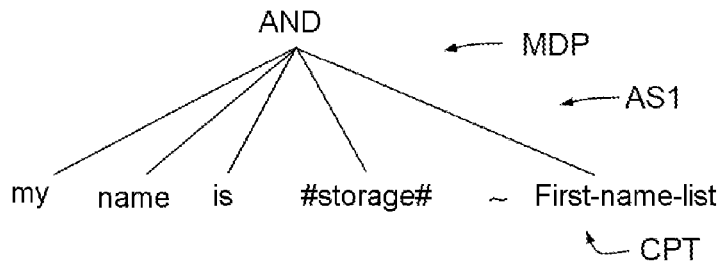
FIGS. 3A, 3B, 3C and 3D, tree structures used for the implementation of a method according to the invention.
Figure 3B:
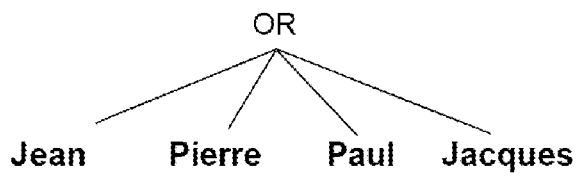

FIG. 3A shows a first example of syntax tree AS1 corresponding to a pattern MDP used, in an implementation of substep c3 of the method, to analyze a sentence spoken by the human speaker. This pattern is written, in a script language developed for this purpose:

"my name is_~First-name-list"

It comprises three words ("my", "name", "is") and a concept ("~First-name-list"). The tilde "~" identifies a concept, the "_" character indicates that the concept must be stored.

The words and the concept—reference CPT—form leaves of the syntax tree AS, linked by an "AND" logic operator forming the root of the tree.

The concept consists of a plurality of words that are semantically close and interchangeable in a sentence—here, it is a list of first names. The concept "First-name-list" is also represented by a tree (FIG. 3B) whose leaves are the interchangeable words ("Jean", "Pierre", "Paul", "Jacques", etc.) and the root of which is an "OR" logic operator. If the speaker says, for example, "My name is Jean", the processor of the robot checks that this sentence corresponds to the pattern and stores (command #storage# which corresponds to the "_" character in the pattern; the "hash" characters-#- indicate that it is not a name which has to be spoken) the value "Jean" in a temporary variable of the memory of the robot.

Figure 3C:
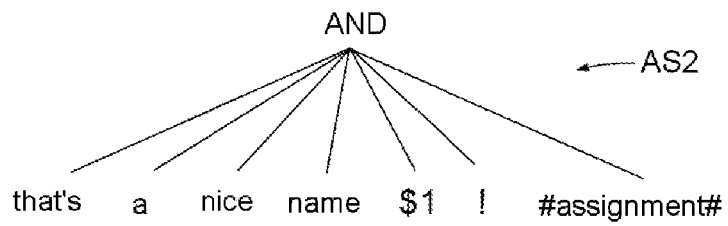
Figure 3C:
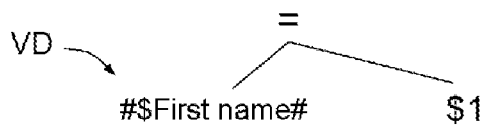

FIG. 3C illustrates another example of syntax tree corresponding to a pattern MDP used, in the implementation of substeps c4 (updating of the speaker profile) and d2 (formulation of a response sentence). This pattern is written:

"that's a nice name $1 ! $INT/First-name=$1"

It comprises four words ("that's", "a", "nice", "name"), an intonation marker ("!") and a pointer to the temporary variable in which the first name of the speaker has been stored ("$1" -the "$" symbol identifying the variables). It also comprises an operation of assignment to the dialog variable VD "$INT/First-name" of the value contained in the temporary variable $1. The assignment operation is also represented by a tree (bottom of FIG. 3B), associating the variable "INT/First-name" and the pointer "$1" via an equality operator "=".

Figure 3D:
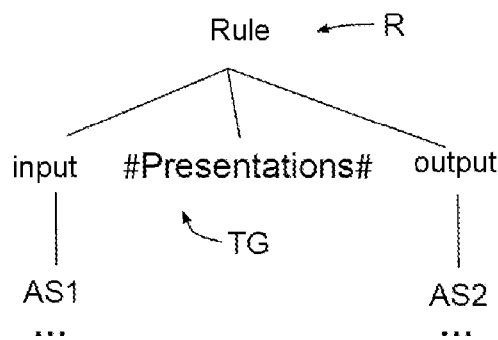

The rules enable the processor to associate the inputs (sentences spoken by the speaker) with outputs (response sentences emitted by the robot). FIG. 3D illustrates the tree R representing such a rule. Here it is a very simple rule which associates the pattern represented by the tree AS1 (input) with the pattern represented by the tree AS2 (output). Thus, by the application of this rule, when the speaker says "my name is Jean", the robot responds "that's a nice name, Jean!" -"Jean" being able to be replaced by any other first name listed in the "First-name-list" concept. Furthermore, as explained above, the processor updates the speaker profile by storing the information that the first name is "Jean", and can use this information subsequently in the course of the dialog.

The rules can be much more complex. For example, the output can be chosen from a number of alternatives as a function of the value assigned to certain variables and/or contextual data (for example the date, as in the example of dialog presented above). Similarly, a number of alternative patterns can be provided as input, associated with the same output or outputs.

The rule tree R also comprises a tag TG: "#Presentation#". In this case, this tag makes it possible to attach the rule to a "conversation topic", which combines semantically close rules—here, the conversation topic consists of the introductions of the speakers. Based on the value of certain variables, on a dialog history recorded in the speaker profile and/or on contextual data, the rules marked by certain tags can be activated or deactivated. Thus, for example, the rules marked by the tag "Christmas" can be activated only between December first and January fifth (contextual datum); the rules marked by the tag "Domestic animals" can be deactivated if the profile indicates that the speaker has none; when a certain number of rules bearing a tag have been applied, it can be considered that the topic has been dealt with sufficiently and these rules can be deactivated for a certain time.

The abovementioned dialog history contains a list of the previous dialogs with their dates, a list of the responses and questions spoken by the robot (the questions already posed are deactivated to avoid repetitions), a list of the tags with their states (activated/deactivated) and a list of the topics which have already been dealt with—with, optionally, a measurement of the degree of depth reached in each topic. This history takes the form of a list of keys and values.

All these features contribute to the personalization and to the progressiveness of the dialog.

The invention claimed is:

1. A method for performing a dialog between a machine and at least one human speaker, comprising the following steps, implemented by said machine:
    a) identifying said human speaker with a processor;
    b) extracting from a database a speaker profile comprising a plurality of dialog variables, at least one value being assigned to at least one of said plurality of dialog variables;
    c) receiving with a sound acquisition device at least one sentence originating from said speaker, analyzing said sentence or each said sentence originating from said speaker with the processor to extract therefrom at least one value to be assigned to at least one dialog variable of said speaker profile and store said value or each said value in said speaker profile in the database; and
    d) formulating with the processor and emitting at least one response sentence through a sound emission device as a function of at least of said sentence received and interpreted in step c) and of one said dialog variable of said speaker profile;
    wherein said sentence or at least one said sentence received and analyzed in step c) is a sentence spoken by said speaker spontaneously or following a non-interrogative sentence emitted by the sound emission device of said machine; and
    wherein the analysis of said sentence or at least one sentence originating from said speaker and the formulation of said or at least one response sentence are performed by means of a plurality of sentence patterns represented by respective syntax trees.

2. The method for performing a dialog as claimed in claim 1, wherein at least some of said sentence patterns contain at least one pointer to a dialog variable of said speaker profile.

3. The method for performing a dialog as claimed in claim 1, wherein at least some of said sentence patterns contain at least one pointer to at least one set of terms that are interchangeable in a sentence, called concept.

4. The method for performing a dialog as claimed in claim 1, wherein said step d) is implemented by means of a plurality of rules associating at least one sentence pattern originating from said speaker and at least one response sentence pattern.

5. The method for performing a dialog as claimed in claim 4, wherein, in said step d), at least one of said plurality of rules associates, with a same sentence pattern originating from said speaker, a plurality of sentence patterns that serve as response sentences; and wherein, out of said response sentence patterns, those which contain a pointer to a dialog variable to which no value is assigned in said speaker profile are discarded.

6. The method for performing a dialog as claimed in claim 4, wherein:
    at least one said rule is marked by a tag identifying a conversation topic;
    in said step d), the rule or rules marked by at least one tag identifying a determined conversation topic are activated or deactivated as a function of at least one dialog parameter.

7. The method for performing a dialog as claimed in claim 1, wherein said speaker profile also comprises a dialog history and, in said step d), said response or at least one said response is also formulated as a function of said dialog history.

8. The method for performing a dialog as claimed in claim 1, wherein, in said step d), said response or at least one said response is also formulated as a function of at least one contextual parameter acquired or determined by said machine.

9. The method for performing a dialog as claimed in claim 1, wherein, in said step a), said human speaker is identified by an image acquisition device, by facial recognition or by reading a graphic code presented to said device.

10. The method for performing a dialog as claimed in claim 1, wherein, in said step b), the machine accesses a remote server via a communication network and downloads said speaker profile from said database which is stored on said remote server.

11. The method for performing a dialog as claimed in claim 10, wherein said machine, having accessed said remote server via said communication network, loads into said database a speaker profile updated by the storage of at least one value assigned to at least one dialog variable extracted, in said step c), from at least one sentence originating from said speaker.

12. The method for performing a dialog as claimed in claim 1, wherein said machine comprises the processor implemented as a processor embedded in a humanoid robot.

13. A humanoid robot wherein the processor comprises an embedded processor programmed to implement a method as claimed in claim 12.

14. The humanoid robot as claimed in claim 13, further comprising:
    an image acquisition device cooperating with said embedded processor to identify a human speaker;
    the sound acquisition device cooperating with said embedded processor to receive at least one sentence spoken by said human speaker; and the sound emission device cooperating with said embedded processor to emit one said response sentence.

15. A non-transitory computer program product for implementing a method as claimed in claim 1, wherein said non-transitory computer program is executed on the processor.

16. A method for performing a dialog between a machine and at least one human speaker, comprising the following steps, implemented by said machine:
   a) identifying said human speaker with a processor;
   b) extracting from a database a speaker profile comprising a plurality of dialog variables, at least one value being assigned to at least one of said plurality of dialog variables;
   c) receiving with a sound acquisition device at least one sentence originating from said speaker, analyzing said sentence or each said sentence originating from said speaker with the processor to extract therefrom at least one value to be assigned to at least one dialog variable of said speaker profile and store said value or each said value in said speaker profile in the database; and
   d) formulating with the processor and emitting at least one response sentence through a sound emission device as a function of at least of said sentence received and interpreted in step c) and of one said dialog variable of said speaker profile;

wherein said sentence or at least one said sentence received and analyzed in step c) is a sentence spoken by said speaker spontaneously or following a non-interrogative sentence emitted by the sound emission device of said machine;

wherein the analysis of said sentence or at least one sentence originating from said speaker and the formulation of said or at least one response sentence are performed by means of a plurality of sentence patterns represented by respective syntax trees;

wherein at least some of said sentence patterns contain at least one pointer to a dialog variable of said speaker profile;

wherein at least some of said sentence patterns contain at least one pointer to at least one set of terms that are interchangeable in a sentence, called concept; and wherein said step d) is implemented by means of a plurality of rules associating at least one sentence pattern originating from said speaker and at least one response sentence pattern.

* * * * *